(12) United States Patent
Fluckiger et al.

(10) Patent No.: US 10,719,924 B2
(45) Date of Patent: Jul. 21, 2020

(54) FULL MOTION COLOR VIDEO ATMOSPHERIC TURBULENCE CORRECTION PROCESSING

(71) Applicant: RAYTHEON COMPANY, Waltham, MA (US)

(72) Inventors: David U. Fluckiger, McKinney, TX (US); Christopher J. Beardsley, McKinney, TX (US); Craig R. Franklin, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 176 days.

(21) Appl. No.: 15/569,757

(22) PCT Filed: Apr. 27, 2015

(86) PCT No.: PCT/US2015/027847
§ 371 (c)(1),
(2) Date: Oct. 26, 2017

(87) PCT Pub. No.: WO2016/175751
PCT Pub. Date: Nov. 3, 2016

(65) Prior Publication Data
US 2018/0130191 A1 May 10, 2018

(51) Int. Cl.
*G06T 5/50* (2006.01)
*G06T 5/00* (2006.01)

(52) U.S. Cl.
CPC .............. *G06T 5/50* (2013.01); *G06T 5/001* (2013.01); *G06T 5/003* (2013.01);
(Continued)

(58) Field of Classification Search
None
See application file for complete search history.

(56) References Cited

U.S. PATENT DOCUMENTS 8,599,439 B2  12/2013  Yu et al.
2007/0280507 A1  12/2007  Murali
(Continued)

FOREIGN PATENT DOCUMENTS

EP  2 680 567 A1  1/2014
EP  2680567 A1 *  1/2014

OTHER PUBLICATIONS

Andrea L. Bertozzi et al: "Video stabilization of atmospheric turbulence distortion", Inverse Problems and Imaging, vol. 7, No. 3, Sep. 1, 2013 (Sep. 1, 2013), pp. 839-861. (Year: 2013).*
(Continued)

*Primary Examiner* — Vu Le
*Assistant Examiner* — Tracy Mangialaschi
(74) *Attorney, Agent, or Firm* — Lewis Roca Rothgerber Christie LLP

(57) ABSTRACT

A system for processing video. The system may include a video camera, a processing unit, and a video display, the video camera being configured to generate a plurality of consecutive luminance frames, including a last frame and a plurality of preceding frames. The processing unit may be configured to: shift the plurality of preceding frames, to register the preceding frames with the last frame to form a plurality of shifted frames, take a Fourier transform of each of the plurality of frames, to form a corresponding plurality of initial Fourier transform frames, iteratively update the plurality of Fourier transform frames by, on the $(n+1)^{th}$ iteration of a plurality of iterations, replacing each Fourier transform frame with a linear combination of the Fourier transform frames of the $n^{th}$ iteration, the Fourier transform frames of the $0^{th}$ iteration being the initial Fourier transform frames.

17 Claims, 6 Drawing Sheets

(52) U.S. Cl.
CPC ............... *G06T 2207/10016* (2013.01); *G06T 2207/10024* (2013.01); *G06T 2207/10032* (2013.01); *G06T 2207/20016* (2013.01); *G06T 2207/20032* (2013.01); *G06T 2207/20056* (2013.01); *G06T 2207/20182* (2013.01)

(56) References Cited

U.S. PATENT DOCUMENTS

| | | | |
|---|---|---|---|
| 2008/0063064 A1 | 3/2008 | MacInnis et al. | |
| 2009/0323808 A1* | 12/2009 | Lin | H04N 19/139 375/240.16 |
| 2010/0098312 A1* | 4/2010 | Leahy | G06T 11/005 382/131 |
| 2010/0165154 A1 | 7/2010 | Chou et al. | |
| 2010/0309377 A1 | 12/2010 | Schoenbium et al. | |

OTHER PUBLICATIONS

Glantz A, Krutz A, Sikora T. Global motion temporal filtering for in-loop deblocking. In 2010 IEEE International Conference on Image Processing Sep. 26, 2010 (pp. 957-960). IEEE. (Year: 2010).*

Robinson, P. E., and W. A. Clarke. "Mitigation of atmospheric turbulence distortions in long range video surveillance." (2011). (Year: 2011).*

Huffman, Rodney D.;Digital image processing for speckle images. Dissertation. Montana State University-Bozeman, College of Engineering, 1984. (Year: 1984).*

Bertozzi, et al., "Video stabilization of atmospheric turbulence distortion", Inverse Problems and Imaging, Sep. 2013, 7(3), pp. 839-861, XP055240845 (ISSN: 1930-8337, DOI: 10.3934/ipi.2013.7.839 abstract sections 3.2-3.4, figure 6).

Collins, "Back to Lucas-Kanade", Jan. 1, 2006, XP055265519, Retrieved from the internet: http://www.cse.psu.edu/~rtc12/CSE598G/LKintroContinued.pdf.

Glantz, et al., "Global motion temporal filtering for in-loop deblocking", 2010 17th IEEE International Conference on Image Processing (ICIP 2010); Sep. 26-29, 2010; Hong Kong, China IEEE, Piscataway, NJ, USA, pp. 957-960, XP031812388 (ISBN: 978-1-4244-7992-4, abstract section 2, figure 2).

Khobragade et al., "Motion Analysis in Video Using Optical Flow Techniques", International Journal of Information Technology and Knowledge Management, Jan. 1, 2012, XP055265527, Retrieved from http://www.csjournals.com/IJITKM/PDF_5-1/Article_3.pdf sections 1-3.

Lucas et al., "An Iterative Image Registration Technique with an Application to Stereo Vision", International Conference on Artificial Intelligence, Aug. 24, 1981, pp. 674-679, XP001032964, section 4.4.

International Search Report for corresponding PCT Application No. PCT/US2015/027847, dated Jun. 6, 2016 (8 pages).

Written Opinion for corresponding PCT Application No. PCT/US2015/027847, dated Jun. 6, 2016 (16 pages).

\* cited by examiner

FULL MOTION COLOR VIDEO ATMOSPHERIC TURBULENCE CORRECTION PROCESSING

GOVERNMENT LICENSE RIGHTS

This invention was made with Government support. The Government has certain rights in the invention.

CROSS-REFERENCE TO RELATED APPLICATION(S)

This application is a National Phase Patent Application and claims priority to and the benefit of International Application Number PCT/US2015/027847, filed on Apr. 27, 2015, the entire content of which is incorporated herein by reference.

BACKGROUND

1. Field

One or more aspects of embodiments according to the present invention relate to video processing, and more particularly to a system and method for correcting the effects of atmospheric turbulence in video data.

2. Description of Related Art

When video is taken through turbulent air, as may be the case when an aircraft-mounted video camera obtains video of the ground, image degradation (e.g., blurring) may be produced by atmospheric turbulence in the air through which light travels on its way from the scene to the video camera. This blurring may degrade the quality of the video and diminish its value to an operator observing the video, or to processing equipment using the video for automated analysis or control. Thus, there is a need for a system and method for mitigating the effects of atmospheric turbulence on video data.

SUMMARY

Aspects of embodiments of the present disclosure are directed toward a system for mitigating the effects of atmospheric turbulence on video data. In one embodiment, frames of video data from a video camera are shifted to register them to each other, and a turbulence correction module is employed to mitigate the effects of atmospheric turbulence in the video data. Chrominance data in the video data are processed in a parallel path, and combined with luminance data for display or subsequent processing.

According to an embodiment of the present invention there is provided a system for processing video, the system including: a video camera; a processing unit; and a video display, the video camera being configured to generate a plurality of consecutive luminance frames, including a last frame and a plurality of preceding frames, the processing unit being configured to: shift the plurality of preceding frames, to register the preceding frames with the last frame to form a plurality of shifted frames, take a Fourier transform of each of the plurality of frames, to form a corresponding plurality of initial Fourier transform frames, iteratively update the plurality of Fourier transform frames by, on the $(n+1)^{th}$ iteration of a plurality of iterations, replacing each Fourier transform frame with a linear combination of the Fourier transform frames of the $n^{th}$ iteration, the Fourier transform frames of the $0^{th}$ iteration being the initial Fourier transform frames, and take an inverse Fourier transform of the average of the Fourier transform frames of a final iteration to form an enhanced luminance frame, and the video display being configured to display the enhanced luminance frame.

In one embodiment, the iterative updating of the plurality of Fourier transform frames includes, on the $(n+1)^{th}$ iteration, replacing a $k^{th}$ Fourier transform frame of the plurality of Fourier transform frames with $$\frac{1}{1+2\mu}\left[\hat{u}_k^n\left(1 - C_k^n \frac{4D(m_1, m_1)}{1 + 4\lambda D(m_1, m_1)}\right) + \mu(\hat{u}_{k+1}^n + \hat{u}_{k-1}^n)\right],$$

wherein: $\hat{u}_{k-1}^n$, $\hat{u}_k^n$, $\hat{u}_{k+1}^n$ are the $(k-1)^{th}$, $k^{th}$ and $(k+1)^{th}$ Fourier transform frames of the $n^{th}$ iteration, $$\frac{4D(m_1, m_1)}{1 + 4\lambda D(m_1, m_1)},$$

is an element-wise ratio, with: 1 being an identity matrix, $$D(m_1, m_2) = \left[\sin\left(\frac{m_1\pi}{M_1}\right)^2 + \sin\left(\frac{m_2\pi}{M_2}\right)^2\right]^p,$$

p being a scalar, with p>1.1 and p<2.0, and $\lambda$ being a scalar, $\mu$ is a scalar, and $C_k^n$ a scalar.

In one embodiment, $\lambda$>2 and $\lambda$<10.
In one embodiment, $\mu$>0.5 and $\mu$<2.
In one embodiment, $$C_k^n = \frac{\sum_{m_1,m_2} D(m_1, m_2)|\hat{u}_k^n(m_1, m_2)|^2}{\sum_{m_1,m_2} D(m_1, m_2)|\hat{u}_k^0(m_1, m_2)|^2} - \alpha$$

wherein $\alpha$ is a scalar.

In one embodiment, $\alpha$>2 and $\alpha$<10.

In one embodiment, the system includes a last chrominance frame and a plurality of preceding chrominance frames, and the processing unit is further configured to: upsample each of the last chrominance frame and the preceding chrominance frames; shift the preceding chrominance frames; average the last chrominance frame and the preceding chrominance frames to form an average chrominance frame; subsample the average chrominance frame to form a subsampled chrominance frame; delay the subsampled chrominance frame; and combine the delayed subsampled chrominance frame with the enhanced luminance frame, and the video display is further configured to display the delayed subsampled chrominance frame with the enhanced luminance frame.

In one embodiment, the upsampling of each of the last chrominance frame and the preceding chrominance frames includes upsampling to a subsampling ratio of 4:4:4.

In one embodiment, the subsampling of the average chrominance frame includes subsampling to a subsampling ratio of 4:2:0.

In one embodiment, the first memory is configured to store a first subset of the last frame and the plurality of preceding frames, the second memory is configured to store a second subset of the last frame and the plurality of preceding frames, and the multiplexer is configured to supply 2 or 3 frames at a time, of the last frame and the plurality of preceding frames, to the math engine.

In one embodiment, the shifting of the plurality of preceding frames includes: processing a first preceding frame of the plurality of preceding frames with a noise filter to form a filtered frame; processing the filtered frame with a horizontal differentiating filter to form an X-derivative frame; processing the filtered frame with a vertical differentiating filter to form a Y-derivative frame; forming a 2×2 matrix of edge strengths from the X-derivative frame and the Y-derivative frame; subtracting the last frame from the first preceding frame to form a difference frame; forming a 2-element gradient vector from the difference frame, the X-derivative frame, and the Y-derivative frame; and forming a shift estimate from the gradient vector and the matrix of edge strengths.

In one embodiment, the horizontal differentiating filter is a horizontal Sobel filter; and the vertical differentiating filter is a vertical Sobel filter.

In one embodiment, the 2×2 matrix of edge strengths is [sum(gx2), sum(gx*gy); sum(gx*gy), sum(gy2)], wherein gx is the X-derivative frame, gy is the Y-derivative frame, gx*gy denotes an element-wise product, the semicolon is a delimiter between the first and second rows of the matrix of edge strengths, and each sum is over all elements of the argument of the sum.

In one embodiment, the gradient vector is [sum(gx*Diff), sum(gy*Diff)], wherein Diff is the difference frame, gx is the X-derivative frame, gy is the Y-derivative frame, each sum is over all elements of the argument of the sum.

According to an embodiment of the present invention there is provided a method for processing video including: generating, by a video camera: a plurality of consecutive luminance frames, including a last luminance frame and plurality of preceding luminance frames, and a plurality of consecutive chrominance frames, including a last chrominance frame and plurality of preceding chrominance frames, shifting the preceding luminance frames, by an estimated shift that registers a last preceding luminance frame of the preceding luminance frames to the last luminance frame, to form, with the last luminance frame, a plurality of registered luminance frames; upsampling each of the plurality of consecutive chrominance frames; shifting the preceding chrominance frames, by the estimated shift, to form, with the last chrominance frame, a plurality of registered chrominance frames; averaging the registered chrominance frames to form an average chrominance frame; subsampling the average chrominance frame to form a subsampled average chrominance frame; processing the registered luminance frames with a resolution-enhancing module to form an enhanced luminance frame; storing the subsampled average chrominance frame during a time interval corresponding to a difference between a luminance information processing time and a chrominance information processing time, combining the subsampled average chrominance frame with the enhanced luminance frame to form a combined frame, and displaying, by a display, the combined frame.

In one embodiment, the upsampling of each of the plurality of consecutive chrominance frames includes upsampling to a subsampling ratio of 4:4:4.

In one embodiment, the subsampling of the average chrominance frame includes subsampling to a subsampling ratio of 4:2:0.

In one embodiment, the combining of the subsampled average chrominance frame with the enhanced luminance frame includes: multiplying the enhanced luminance frame by a scale factor; and adding an offset to the enhanced luminance frame, to form an adjusted enhanced luminance frame, wherein the scale factor and the adjusted enhanced luminance frame are selected such that a median value and a range of the adjusted enhanced luminance frame are substantially the same as a median value and a range of a luminance frame generated by the video camera.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a method for full motion color video atmospheric turbulence correction processing provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
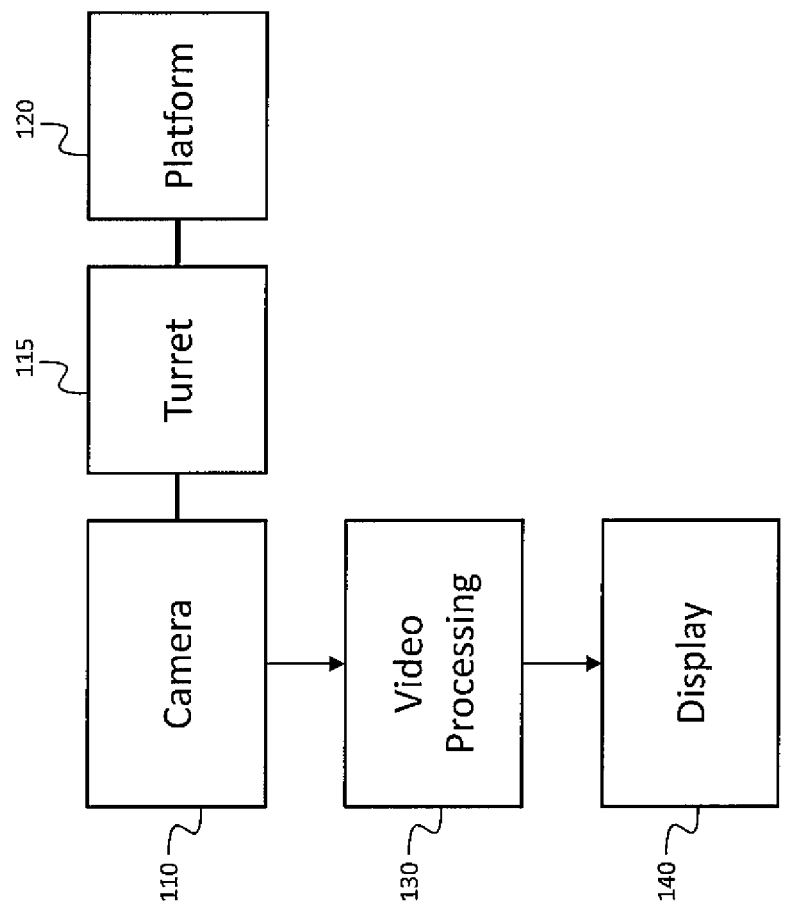
FIG. 1 is a block diagram of a video system according to an embodiment of the present invention.

Referring to FIG. 1, in one embodiment a video camera 110 is secured to a turret 115, which is in turn secured to a platform 120, such as an aircraft, vessel, vehicle, or human. The turret 115 steers the video camera 110; video from the video camera 110 is processed by a video processing module 130 that generates processed video, and the processed video is displayed on a display 140. In other embodiments the video is sent to a control system which may, for example, control the turret 115 to track features of interest in the video images.

The video processing module 130 may be implemented in one or more processing units. The term "processing unit" is used herein to include any combination of hardware, firmware, and software employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed wiring board (PWB) or distributed over a plurality of interconnected PWBs. A processing unit may contain other processing units; for example, a processing unit may include two processing units, an FPGA and a CPU, interconnected on a PWB.

In the processing unit, data processing may be performed by modules. As used herein, a "module" is a system element that receives digital numerical input and generates digital numerical output. The numerical input and output may be stored in memory in a batch mode, in which, for example, an output array is formed and stored on a stack or in a heap for subsequent use or processing, or the numerical input and/or output may be streamed out of the module in smaller increments, e.g., one double-precision number at a time, or one byte at a time. The module may be implemented in software or in hardware or in a combination thereof. In one embodiment, each module is a piece of software (e.g., a function, a subroutine, or an object) running on a processing unit. In each case, the module has the effect of performing an operation on the data it receives, to generate the data that it produces. Thus for embodiments disclosed herein, a system including a module that performs an operation is equivalent to the system being configured to perform the operation. For example, a fast Fourier transform (FFT) module performs an FFT operation on the input data that are fed to it, to form output data that are the FFT of the input data. A module may contain or include other modules; e.g., a function may call other functions, or a piece of data processing hardware, such as an FPGA, may contain modules such as functional blocks, each performing operations contributing to data processing performed by the FPGA.

The video processing module 130 may include a turbulence correction (TC) module, i.e., a processing module for mitigating the image degradation (e.g., blurring) that may be produced by atmospheric turbulence in the air through which light travels on its way from the scene to the video camera 110.

Figure 2:
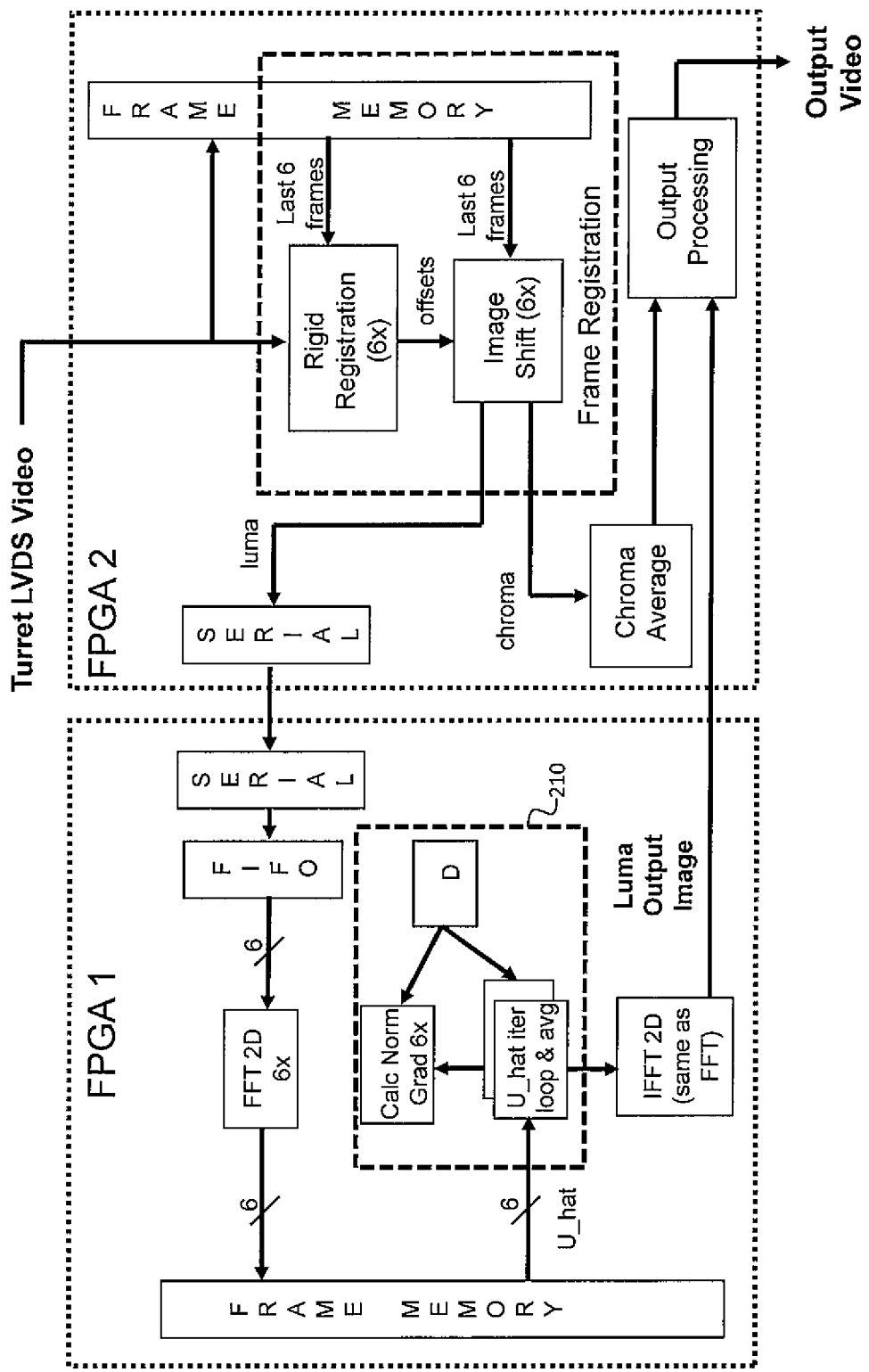
FIG. 2 is a block diagram of a video processing module according to an embodiment of the present invention.

Referring to FIG. 2, the video processing module 130 may include one or more field programmable gate arrays (FPGAs) such as FPGA1 and FPGA2. The video data stream from the video camera 110 may contain full frames of video with a resolution of 1080p, i.e., 1920×1080 pixels, at a frame rate of 30 Hz. Each full frame may include a full luminance, or "luma", frame and a full chrominance, or "chroma", frame; the full chrominance frame may be subsampled (i.e., it may have lower resolution than the full luminance frame). A region of interest extraction module may be used to extract from the received full video frames a region of interest, and store the corresponding frames in a frame memory, overwriting old frames when they are no longer needed. As used herein, a "frame" refers to a frame of the region of interest, the term "full frame" being used to refer to full video frames received from the video camera 110. Like a full frame, each frame (of the region of interest) may include a luminance frame and a chrominance frame. These frames may be, e.g., 256×256 pixels, or 512×256 pixels, and may consist of a square or rectangular region at or near the center of the field of view of the video camera 110. The frames may be processed to increase the quality of the video. Processing only a region of interest may reduce the computational burden on the video processing module 130.

The video processing module 130 may operate on K frames (of the region of interest) at a time, including a most recent frame, or "last frame", and K−1 "preceding frames", received before the last frame. In one embodiment K=6, i.e., the system operates on 6 frames at a time. A frame registration module may be used to determine a shift that may be used to register the preceding frames to the last frame, and this shift may be used to register both the luminance and the chrominance frames. The luminance frames may then be processed by a turbulence correction (TC) module to form enhanced luminance frames, and the chrominance frames may be processed by a chrominance averaging module to form subsampled average chrominance frames. Finally, the enhanced luminance frames may be recombined with the subsampled average chrominance frames in an output processing module, to form enhanced color video frames, or "output video", which may be displayed on the display 140.

Figure 3:
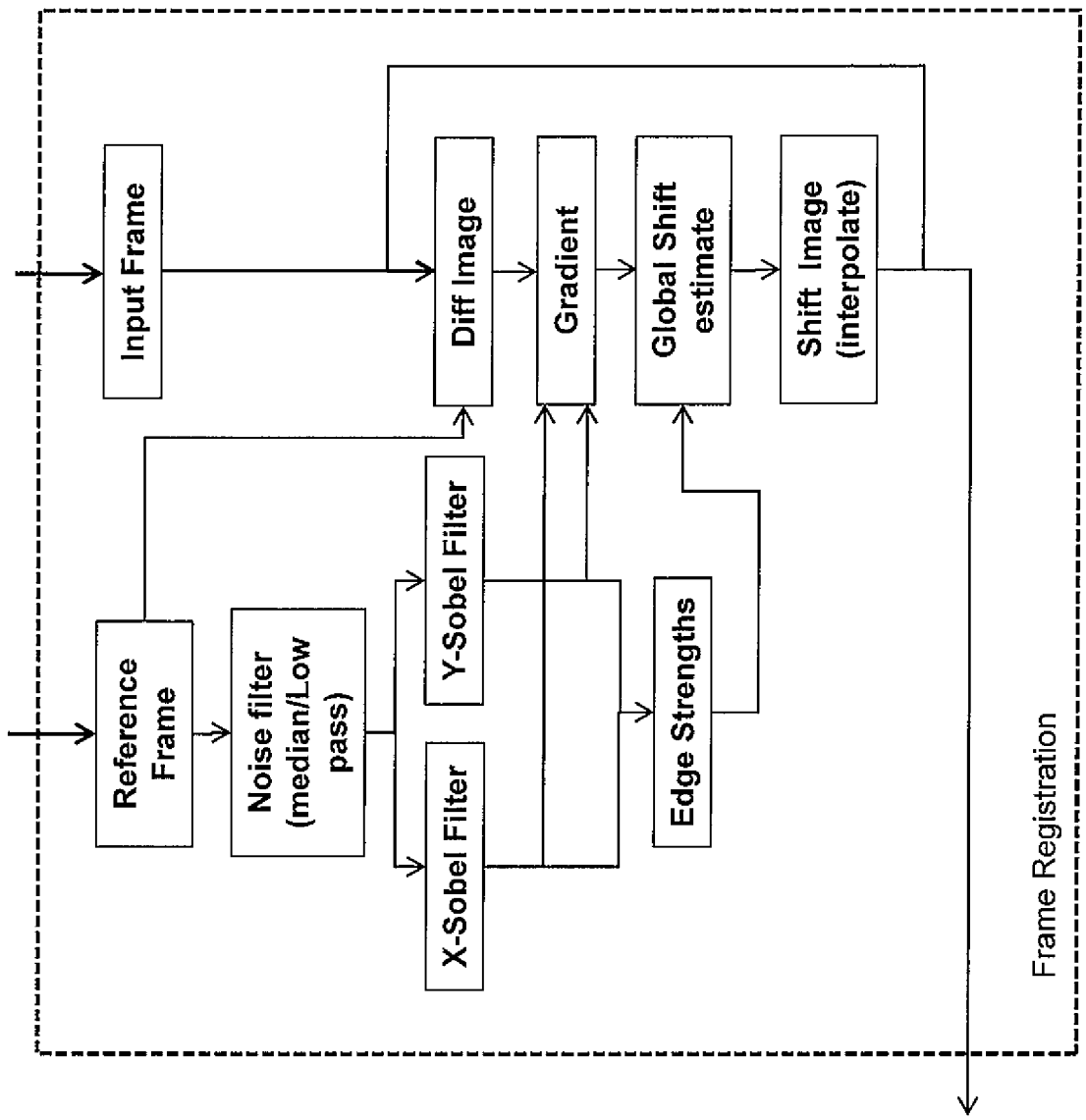
FIG. 3 is a block diagram of a frame registration module according to an embodiment of the present invention.

Referring to FIG. 3, in one embodiment the frame registration module takes two inputs: a reference frame, i.e., the last frame, and an input frame, which is the second-last frame, or "last preceding frame", i.e., the frame received before the last frame. Both the reference frame and input frame may be luminance frames. The reference frame is processed by a noise-filtering module which may include a median filter (e.g., a 3×3 median filter) and/or a low-pass filter (e.g., a low-pass filter, such as a Gaussian filter, with a corner frequency of between 7 and 10 pixels). If both a median filter and a low-pass filter are used in the noise-filtering module, the median filter may precede the low-pass filter or vice versa. The output of the noise-filtering module may be processed by two parallel Sobel filters, each of which performs a numerical differentiation, one in the X direction (a horizontal differentiating filter) and one in the Y direction (a vertical differentiating filter). The outputs of the X-Sobel filter (or horizontal Sobel filter) and the Y-Sobel filter (or vertical Sobel filter) are arrays of the same size or approximately the same size as the reference frame, and are referred to as gx (or an X-derivative frame) and gy (or a Y-derivative frame) respectively. A 2×2 matrix of edge strengths is then calculated as EdgeStrengths=[sum($gx^2$), sum(gx*gy); sum(gx*gy), sum($gy^2$)], where gx*gy denotes an element-wise product, the semicolon is a delimiter between the first and second rows of the matrix, and the sum function sums over all elements of the argument of the function, the arguments in the expression for EdgeStrengths each being a 2-dimensional array. A gradient is then calculated in a gradient module, the gradient being the vector Grad=[sum(gx*Diff), sum(gy*Diff)], where Diff is the difference between the reference frame and the input frame, calculated in a difference module ("Dif Image" in FIG. 3). A global shift estimate module then calculates an estimate of the shift required to register the input frame to the reference frame. This estimate is calculated as inv(EdgeStrengths)*Grad, where inv(EdgeStrengths) is the inverse of the 2×2 EdgeStrengths matrix, and the product is a matrix product. The input image is then shifted, and the process is repeated. In one embodiment, the image is shifted using a bicubic spline to interpolate between pixels, making shifts of a fraction of a pixel possible.

The calculation and application of the estimated shift required to register the frames may be repeated, in a loop, a fixed number of times, or until the estimated shift required is less than a lower threshold selected to test for adequate registration. In one embodiment the loop is repeated 10 times, and the global shift estimate at the end of the final iteration is used to determine whether the frame registration succeeded. For example a global shift estimate that is less than +/−½ A pixel in the X direction and less than +/−½ A pixel in the Y direction may be considered an indication that frame registration succeeded; a global shift estimate that is larger in either direction may be considered an indication that frame registration failed. If the frame registration has succeeded, then all K−1 of the preceding frames are shifted according to the final global shift estimate, and the set of K frames, thus registered to each other, is sent to the turbulence correction module for further processing. When the K−1 frames are shifted, K−2 of them are frames that may have already been shifted, e.g., before the current frame was received. Thus, the shift in previous frames may accumulate as new frames are received. The K frames are also saved in the frame memory so that when the next new frame is received, the set of frames that will then form the K−1 previously received frame will already be registered to each other. In one embodiment, only luminance frames are used to determine the shift required to register the input frame to the reference frame (i.e., chrominance frames are not used for this purpose). Once determined, the shift is applied to shift the K−1 previously received luminance frames to register them to the last luminance frame, and the same shift is applied to shift the K−1 previously received chrominance frames to register them to the last chrominance frame.

Under some circumstances, e.g., if the turret 115 is causing the video camera 110 to pan rapidly, frame registration may fail. In this case, the preceding frames are purged or marked as unusable, and the process starts again when another frame is received. Table 1 below shows an example, for K=6, corresponding to the receipt of a sequence of 10 frames. In this example frame registration fails at the receipt of frame N+2, so that only one frame is output from the frame registration module at this step. It succeeds, or "passes", at the next step, upon receipt of frame N+3, so that two frames are output from the frame registration module at this step, and then fails again at frame N+4, so that, again, only one frame is output from the frame registration module at this step. It then succeeds for each of the remaining steps of the sequence, with a larger number of frames being output from the frame registration module at each step, until the maximum number of 6 frames is again being processed.

TABLE 1

| Frame Number | N | N + 1 | N + 2 | N + 3 | N + 4 | N + 5 | N + 6 | N + 7 | N + 8 | N + 9 | N + 10 |
| --- | --- | --- | --- | --- | --- | --- | --- | --- | --- | --- | --- |
| Processed Frames | 6 | 6 | 1 | 2 | 1 | 2 | 3 | 4 | 5 | 6 | 6 |
| Registration Passed | Y | Y | N | Y | N | Y | Y | Y | Y | Y | Y |

As mentioned above, if frame registration has not failed during the previous K frames, then a set of K frames is sent to the turbulence correction module. Referring again to FIG. 2, the modules of the video processing module 130 may be distributed across multiple FPGAs; for example, the turbulence correction module may be implemented in a second FPGA, such as FPGA 1 of FIG. 2. In such a system data may be transferred between the FPGAs using, for example, a communications interface ("SERIAL" in FIG. 2), implemented in each of the FPGAs. A first-in-first-out data structure ("FIFO") may be used with the interface, for example, to buffer received data until processing begins.

In one embodiment the turbulence correction module implements a numerical solution of a Sobolev-Laplace partial differential equation, which includes a time-reversed diffusion equation and a Laplace filter. The solution is generated numerically in the frequency domain. Each of the K frames received from the frame registration module is transformed by Fourier transform (e.g., by fast Fourier transform, or "FFT") into the spatial frequency domain to form one of K Fourier transform frames. An iterative solution module 210 then iteratively adjusts the K Fourier transform frames, each iteration producing a better approximation to the solution of the partial differential equation.

The spatial frequency domain processing proceeds according to the following equation, in which k is a frame index, and n is an iteration index:

$$\hat{u}_k^{n+1} - \hat{u}_k^n = C_k^n \frac{-4D(m_1, m_2)}{1 + 4\lambda D(m_1, m_2)} \hat{u}_k^n + \mu\left(\hat{u}_{k+1}^n + \hat{u}_{k-1}^n - 2\hat{u}_k^{n+1}\right) \quad (1)$$

This equation approximates the Sobolev-Laplace partial differential equation. The quantity $\hat{u}_k^n$ is the $k^{th}$ Fourier transform frame at the $n^{th}$ iteration of the iterative solution. Equation (1) has, on the right hand side, a first term corresponding to a diffusion equation, and a second term corresponding to a Laplace filter. The ratio $$\frac{4D(m_1, m_1)}{1 + 4\lambda D(m_1, m_1)}$$

denotes an element-wise ratio of matrices (with 1 being an identity matrix of the same size as D), and the matrix $D(m_1, m_2)$ is defined $$D(m_1, m_2) = \left[\sin\left(\frac{m_1\pi}{M_1}\right)^2 + \sin\left(\frac{m_2\pi}{M_2}\right)^2\right]^p \quad (2)$$

where p is a parameter that, when selected to be greater than 1, increases the magnitude of the middle spatial frequencies. The value of p may be between 1.1 and 2.0, and in one embodiment it is 1.3. In other embodiments the value of p may be less than 1, e.g., it may be between 0.5 and 0.9. In other embodiments the value of p may be between 0.5 and 2.0

The product $$\frac{-4D(m_1, m_2)}{1 + 4\lambda D(m_1, m_2)} \hat{u}_k^n$$

is an element-wise product of the matrices $$\frac{-4D(m_1, m_2)}{1 + 4\lambda D(m_1, m_2)}$$

and $\hat{u}_k^n$. The quantity $C_k^n$ is defined as:

$$C_k^n = \frac{\sum_{m_1,m_2} D(m_1,m_2)|\hat{u}_k^n(m_1,m_2)|^2}{\sum_{m_1,m_2} D(m_1,m_2)|\hat{u}_k^0(m_1,m_2)|^2} - \alpha \quad (3)$$

where $\alpha$ is a parameter that may be adjusted to change the amount of image sharpening performed by the turbulence correction module; in one embodiment $\alpha$ is about 5.

Equation (1) may be rewritten as $$\hat{u}_k^{n+1} = \frac{1}{1+2\mu}\left[\hat{u}_k^n\left(1 - C_k^n \frac{4D(m_1,m_1)}{1+4\lambda D(m_1,m_1)}\right) + \mu(\hat{u}_{k+1}^n + \hat{u}_{k-1}^n)\right] \quad (4)$$

which gives the $k^{th}$ Fourier transform frame at the $(n+1)^{th}$ iteration as a function of Fourier transform frames at the previous iteration.

Listing 1 below shows Matlab™ code corresponding to the operations of a turbulence correction module in the spatial frequency domain.

Listing 1

```
1   for it = 1:maxIter
2       % update chi
3       chi(1) = normGrad(1)/grad0(1)-alpha;
4       % update end member
5       uhat(:,:,1) = (uhat(:,:,1).*(1-chi(1)*Dkern)+mu*(uhat(:,:,2)))./(1+mu);
6       % update interior members
7       for k = 2:K-1
8           chi(k) = normGrad(k)/grad0(k)-alpha;
9           uhat(:,:,k) = (uhat(:,:,k).*(1-chi(k)*Dkern)+mu*(uhat(:,:,k-1)+uhat(:,:,k-1)))./(1+2*mu);
10      end
11      % update end member
12      chi(K) = normGrad(K)/grad0(K)-alpha;
13      uhat(:,:,end) = (uhat(:,:,end).*(1-chi(K)*Dkern)+mu*(uhat(:,:,end-1)))./(1+mu);
14      % update normalized gradient
15      for k = 1:K
16          normGrad(k) = abs(sum(sum(D.*squeeze(conj(uhat(:,:,k)).*uhat(:,:,k)))));
17      end
18  end
```

In Listing 1, line 8 implements Equation (3), and line 9 implements Equation (4). Modified expressions are used (at lines 3 and 5, and at lines 12 and 13) for the first and $K^{th}$ frames, for which there is no $(k-1)^{th}$ or $(k+1)^{th}$ frame available, respectively. The quantity normGrad(k) is the numerator of the first term of Equation (3); it is updated at the end of each iteration, at lines 15-17 of Listing 1. The quantity Dkern of Listing 1 is $$\frac{4D(m_1,m_1)}{1+4\lambda D(m_1,m_1)};$$

the parameter $\lambda$ affects the rate of convergence of the iterative solution, but will cause overshoot if selected to be too large. In one embodiment $\lambda$ is about 5. The quantity $\mu$ (mu in Listing 1) affects the balance between the relative degree to which spatial domain corrections and temporal domain corrections contribute to the adjustments applied by the turbulence correction module; in one embodiment, $\mu=1$. In one embodiment, the number of iterations (e.g., maxIter on line 1 of Listing 1) is set to a value, e.g., 6, that allows the video processing module 130 to complete the turbulence correction process in the time interval between consecutive frames of video (e.g., in $\frac{1}{30}^{th}$ of a second for 30 Hz video).

Once an acceptable solution has been generated in the spatial frequency domain, the resulting K frames are averaged together and an inverse FFT (IFFT) is used to transform the average frame back into the image domain, forming an enhanced frame. If the input frames are luminance frames, then the output frames are enhanced luminance frames.

Figure 4:
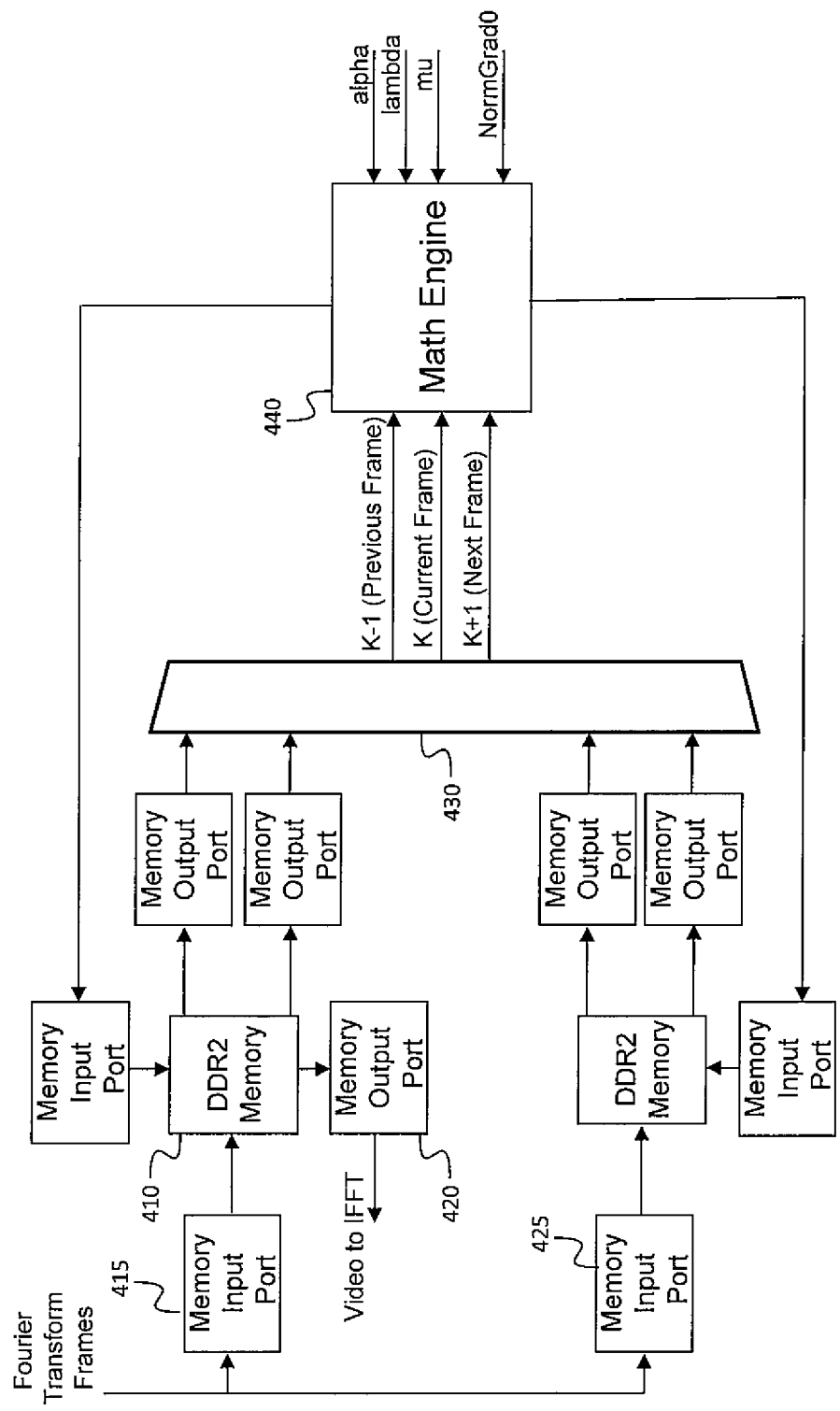
FIG. 4 is a block diagram of a turbulence correction module according to an embodiment of the present invention.
Figure 5:
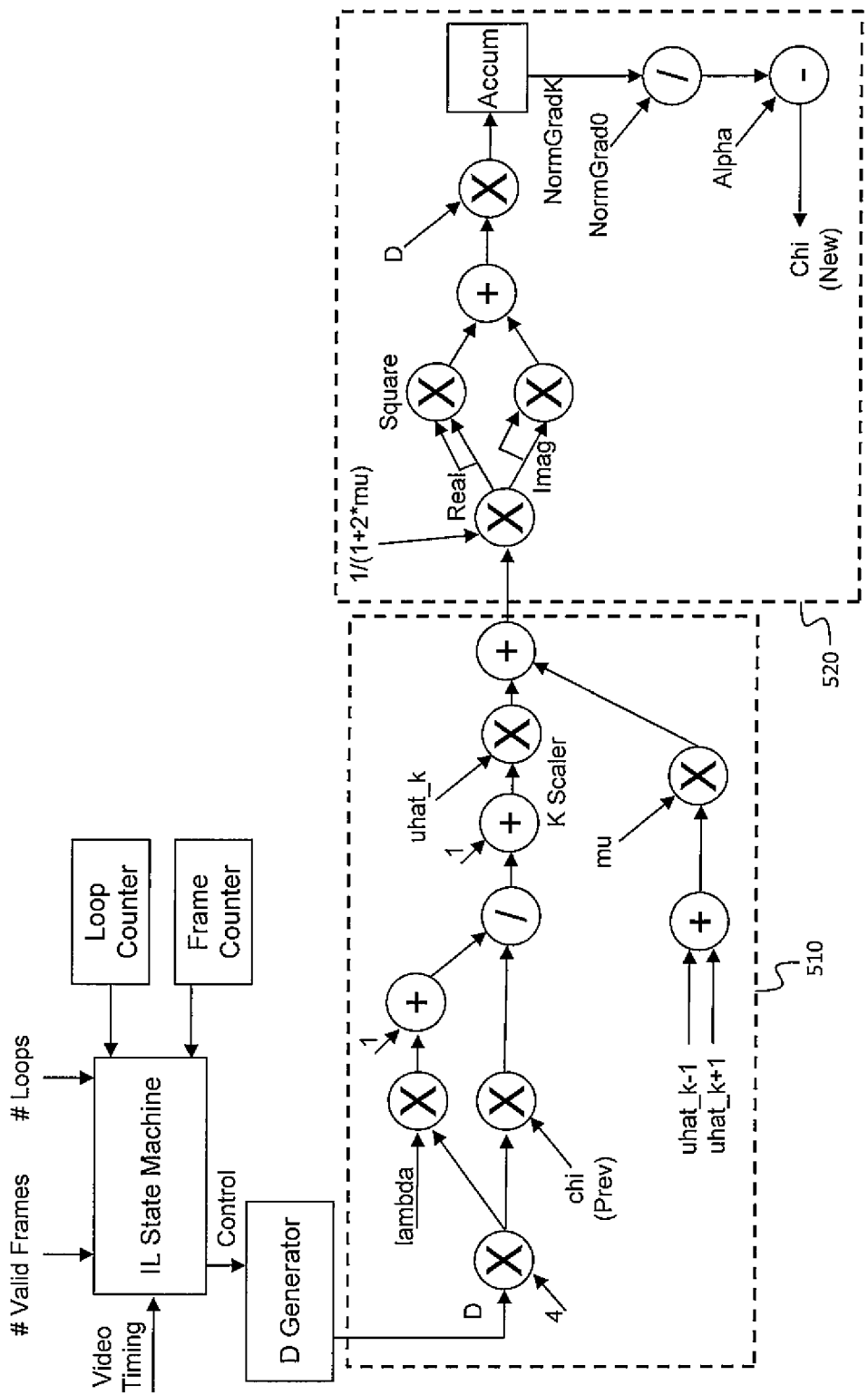
FIG. 5 is a block diagram of a math engine according to an embodiment of the present invention.

The turbulence correction module may be implemented in an FPGA as illustrated in FIGS. 4 and 5. Referring to FIG. 4, in one embodiment, Fourier transform frames are fed alternately into two double data rate synchronous dynamic random-access memories (e.g., DDR2 memories) 410, 420, via respective memory ports 415, 425. For example, if K=6 (i.e., 6 frames contribute to each output of the turbulence correction module), then Fourier transform frames 1, 3, and 5 may be in the first DDR2 memory 410 and Fourier transform frames 2, 4, and 6 may be in the second DDR2 memory 420. A multiplexer 430 transfers two or three frames at a time into the math engine 440, which executes operations corresponding to the calculations of Listing 1. Two frames, for example, are transferred when calculating an updated value for an "end frame" (the first or $K^{th}$ Fourier transform frame), and three Fourier transform frames are transferred when calculating an updated value for any of the other ("intermediate") Fourier transform frames. The math engine 440 takes as input the parameters alpha, lambda, and mu, and an initial value of the quantity NormGrad for each Fourier transform frame (referred to as NormGrad0 in FIG. 4, and as grad0 in Listing 1). To average all of the Fourier transform frames prior to taking the IFFT, the math engine sums the Fourier transform frames in the first DDR2 memory 410 to form a first sum, and sums the Fourier transform frames in the second DDR2 memory 420 to form a second sum, then sums the first sum and the second sum and divides by the number of Fourier transform frames (e.g., 6).

Referring to FIG. 5, the math engine may contain an iterative loop (IL) state machine for controlling operations, loop and frame counters, a D generator for generating values of D ($m_1$, $m_2$), and combinations of arithmetic modules for performing arithmetic operations. For example a first arithmetic block 510 may contain multipliers ("X"), adders ("+"), and a divider ("/") for calculating, for each intermediate frame and for each iteration, the value of:

(uhat(:,:,k).*(1-chi(k)*Dkern)+mu(uhat(:,:,k+1)+uhat(:,:,k-1))), which is the numerator of the expression of line 9 of Listing 1 (or, equivalently, the second factor of the right hand side of Equation (4)). A second arithmetic block 520 may then form the updated Fourier transform frame (by multiplying by 1/(1+2mu)), and calculate a new value of chi (i.e., $C_k''$) with a combination of arithmetic blocks and an accumulator as shown. For the end frames, the control logic of the math engine may use only two Fourier transform frames instead of three, and the factor by which the output of the first arithmetic block 510 is multiplied may be 1/(1+mu) instead of 1/(1+2*mu), as is the case, for example, in lines 5 and 13 of Listing 1. The D generator is a module to generate values of $D(m_1, m_2)$ as defined in Equation (2). In one embodiment, the D generator uses a commercial package for calculating a sine. The calculations of the math engine may be performed as fixed point calculations.

Figure 6:
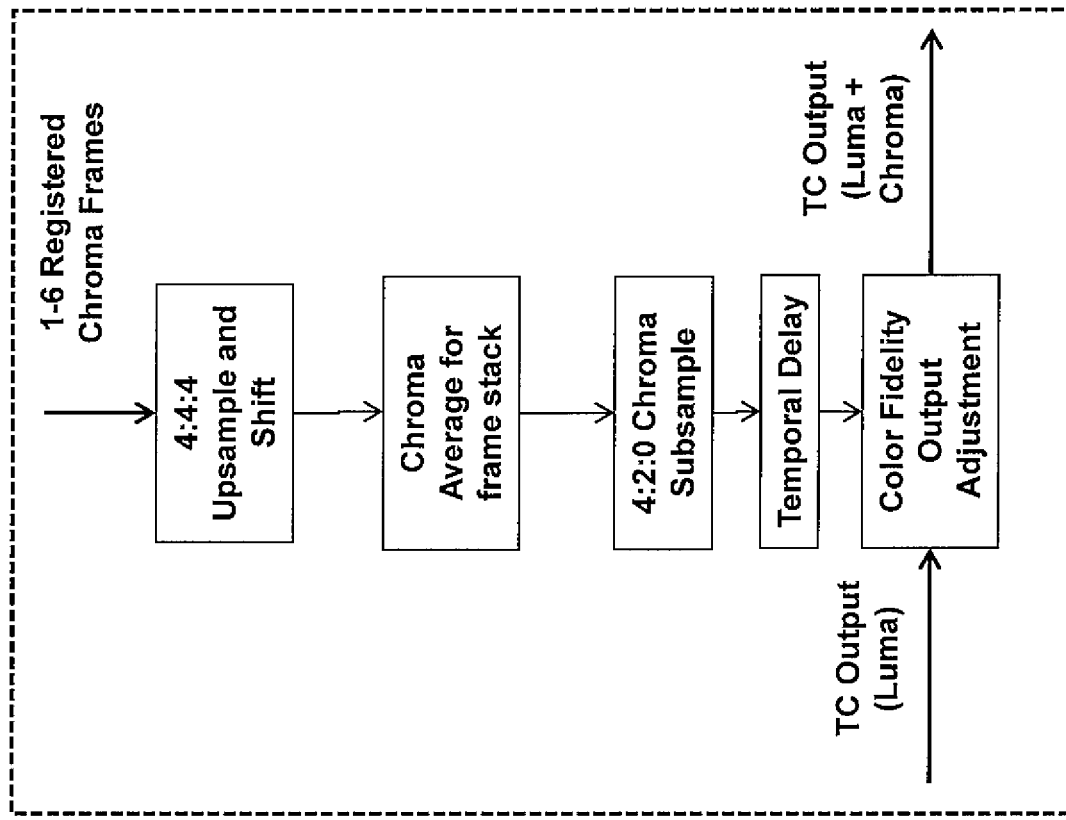
FIG. 6 is a block diagram of chrominance processing modules according to an embodiment of the present invention.

In one embodiment, the processing of chrominance frames may proceed according to the block diagram shown in FIG. 6. The frames received from the video camera 110 may include both full resolution luminance frames, and chrominance frames subsampled with a chrominance subsampling ratio of 4:2:0. Each chrominance frame is, in one embodiment, upsampled to full resolution (4:4:4 subsampling) during the interpolation process used to shift the frame according to the shift estimate generated by the frame registration module. Thus, the result of the shifting is a set of K full resolution chrominance frames, which are shifted so as to be registered to each other and to the luminance frames. These chrominance frames are averaged together, forming one average chrominance frame at full resolution, and then subsampled to a chrominance subsampling ratio of 4:2:0, delayed for synchronization with the luminance frames (which may be delayed, e.g., by two frames, in the turbulence correction module), and recombined with the enhanced luminance frames.

Because the luminance frame processing may affect the gain and offset of the luminance frames, the "Color Fidelity Output Adjustment" module (labeled "Output Processing" in FIG. 2) may also measure the median value and range (i.e., the maximum value minus the minimum value) of input luminance frames, and multiply the enhanced luminance frame by a scale factor and add an offset so that the median value and range of the enhanced luminance frame are the same as those of the input luminance frame, before combining the chrominance frame with the luminance frame. The combined chrominance and luminance frame that results may then be fed to a display to be displayed to an operator.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although limited embodiments of a method for full motion color video atmospheric turbulence correction processing have been specifically described and illustrated herein, many modifications and variations will be apparent to those skilled in the art. Accordingly, it is to be understood that a method for full motion color video atmospheric turbulence correction processing employed according to principles of this invention may be embodied other than as specifically described herein. The invention is also defined in the following claims, and equivalents thereof.

What is claimed is:

1. A system for processing video, the system comprising:
   a video camera;
   a processing unit; and
   a video display,
   the video camera being configured to generate a plurality of consecutive luminance frames, comprising a last frame and a plurality of preceding frames,
   the processing unit being configured to:
      shift the plurality of preceding frames, to register the preceding frames with the last frame to form a plurality of shifted frames,
      take a Fourier transform of each of the plurality of shifted frames, to form a corresponding plurality of initial Fourier transform frames,
      iteratively update the plurality of Fourier transform frames by, on the $(n+1)^{th}$ iteration of a plurality of iterations, replacing each Fourier transform frame with a linear combination of the Fourier transform frames of the $n^{th}$ iteration, the Fourier transform frames of the $0^{th}$ iteration being the initial Fourier transform frames, and take an inverse Fourier transform of an average of the Fourier transform frames of a final iteration to form an enhanced luminance frame, and the video display being configured to display the enhanced luminance frame, wherein:

the video camera is further configured to generate a plurality of consecutive chrominance frames, comprising a last chrominance frame and a plurality of preceding chrominance frames, and the processing unit is further configured to:

upsample each of the last chrominance frame and the preceding chrominance frames;

shift the preceding chrominance frames;

average the last chrominance frame and the preceding chrominance frames to form an average chrominance frame;

subsample the average chrominance frame to form a subsampled chrominance frame;

delay the subsampled chrominance frame; and combine the delayed subsampled chrominance frame with the enhanced luminance frame, and the video display is further configured to display the delayed subsampled chrominance frame with the enhanced luminance frame.

2. The system of claim 1, wherein the iterative updating of the plurality of Fourier transform frames comprises, on the $(n+1)^{th}$ iteration, replacing a $k^{th}$ Fourier transform frame of the plurality of Fourier transform frames with $$\frac{1}{1+2\mu}\left[\hat{u}_k^n\left(1 - C_k^n \frac{4D(m_1, m_1)}{1+4\lambda D(m_1, m_1)}\right) + \mu(\hat{u}_{k+1}^n + \hat{u}_{k-1}^n)\right],$$

wherein:

$\hat{u}_{k-1}^n, \hat{u}_k^n, \hat{u}_{k+1}^n$ are the $(k-1)^{th}, k^{th}$ and $(k+1)^{th}$ Fourier transform frames of the $n^{th}$ iteration, $$\frac{4D(m_1, m_1)}{1+4\lambda D(m_1, m_1)},$$

is an element-wise ratio, with:

1 being an identity matrix, $$D(m_1, m_2) = \left[\sin\left(\frac{m_1\pi}{M_1}\right)^2 + \sin\left(\frac{m_2\pi}{M_2}\right)^2\right]^p,$$

p being a scalar, with p>1.1 and p<2.0, and $\lambda$ being a scalar, $\mu$ is a scalar, and $C_k^n$ is a scalar.

3. The system of claim 2, wherein $\lambda$>2 and $\lambda$<10.

4. The system of claim 2, wherein $\mu$>0.5 and $\mu$<2.

5. The system of claim 2, wherein $$C_k^n = \frac{\sum_{m_1, m_2} D(m_1, m_2)|\hat{u}_k^n(m_1, m_2)|^2}{\sum_{m_1, m_2} D(m_1, m_2)|\hat{u}_k^0(m_1, m_2)|^2} - \alpha$$

wherein $\alpha$ is a scalar.

6. The system of claim 5, wherein $\alpha$>2 and $\alpha$<10.

7. The system of claim 1, wherein the upsampling of each of the last chrominance frame and the preceding chrominance frames comprises upsampling to a subsampling ratio of 4:4:4.

8. The system of claim 1, wherein the subsampling of the average chrominance frame comprises subsampling to a subsampling ratio of 4:2:0.

9. The system of claim 1, wherein the processing unit comprises:

a first memory;

a second memory;

a multiplexer; and a math engine, wherein:

the first memory is configured to store a first subset of the last frame and the plurality of preceding frames, the second memory is configured to store a second subset of the last frame and the plurality of preceding frames, and the multiplexer is configured to supply 2 or 3 frames at a time, of the last frame and the plurality of preceding frames, to the math engine.

10. The system of claim 1, wherein the shifting of the plurality of preceding frames comprises:

processing a first preceding frame of the plurality of preceding frames with a noise filter to form a filtered frame;

processing the filtered frame with a horizontal differentiating filter to form an X-derivative frame;

processing the filtered frame with a vertical differentiating filter to form a Y-derivative frame;

forming a 2×2 matrix of edge strengths from the X-derivative frame and the Y-derivative frame;

subtracting the last frame from the first preceding frame to form a difference frame;

forming a 2-element gradient vector from the difference frame, the X-derivative frame, and the Y-derivative frame; and forming a shift estimate from the gradient vector and the matrix of edge strengths.

11. The system of claim 10, wherein:

the horizontal differentiating filter is a horizontal Sobel filter; and the vertical differentiating filter is a vertical Sobel filter.

12. The system of claim 10, wherein the 2×2 matrix of edge strengths is [sum(gx$^2$), sum(gx*gy); sum(gx*gy), sum (gy$^2$)], wherein gx is the X-derivative frame, gy is the Y-derivative frame, gx*gy denotes an element-wise product, the semicolon is a delimiter between the first and second rows of the matrix of edge strengths, and each sum is over all elements of the argument of the sum.

13. The system of claim 10, wherein the gradient vector is [sum(gx*Diff), sum(gy*Diff)], wherein Diff is the difference frame, gx is the X-derivative frame, gy is the Y-derivative frame, each sum is over all elements of the argument of the sum.

14. A method for processing video comprising:

generating, by a video camera:

a plurality of consecutive luminance frames, comprising a last luminance frame and plurality of preceding luminance frames, and a plurality of consecutive chrominance frames, comprising a last chrominance frame and plurality of preceding chrominance frames, shifting the preceding luminance frames, by an estimated shift that registers a last preceding luminance frame of the preceding luminance frames to the last luminance frame, to form, with the last luminance frame, a plurality of registered luminance frames;

upsampling each of the plurality of consecutive chrominance frames;

shifting the preceding chrominance frames, by the estimated shift, to form, with the last chrominance frame, a plurality of registered chrominance frames;

averaging the registered chrominance frames to form an average chrominance frame;

subsampling the average chrominance frame to form a subsampled average chrominance frame;

processing the registered luminance frames with a resolution-enhancing module to form an enhanced luminance frame;

storing the subsampled average chrominance frame during a time interval corresponding to a difference between a luminance information processing time and a chrominance information processing time, combining the subsampled average chrominance frame with the enhanced luminance frame to form a combined frame, and displaying, by a display, the combined frame.

15. The method of claim 14, wherein the upsampling of each of the plurality of consecutive chrominance frames comprises upsampling to a subsampling ratio of 4:4:4.

16. The method of claim 14, wherein the subsampling of the average chrominance frame comprises subsampling to a subsampling ratio of 4:2:0.

17. The method of claim 14, wherein the combining of the subsampled average chrominance frame with the enhanced luminance frame comprises:

multiplying the enhanced luminance frame by a scale factor; and adding an offset to the enhanced luminance frame, to form an adjusted enhanced luminance frame, wherein the scale factor and the adjusted enhanced luminance frame are selected such that a median value and a range of the adjusted enhanced luminance frame are substantially the same as a median value and a range of a luminance frame generated by the video camera.

* * * * *